(12) United States Patent
　　Gaikwad et al.

(10) Patent No.: US 12,573,072 B2
(45) Date of Patent: Mar. 10, 2026

(54) SYSTEM AND METHOD FOR OBJECT DETECTION IN DISCONTINUOUS SPACE

(71) Applicant: Jio Platforms Limited, Ahmedabad (IN)

(72) Inventors: Tejas Sudam Gaikwad, Pune (IN); Bhupendra Sinha, Pune (IN); Gaurav Duggal, Hyderabad (IN); Manoj Kumar Garg, Morena (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 510 days.

(21) Appl. No.: 18/145,907

(22) Filed: Dec. 23, 2022

(65) Prior Publication Data

US 2023/0206484 A1 Jun. 29, 2023

(30) Foreign Application Priority Data

Dec. 23, 2021 (IN) .............................. 202121060327

(51) Int. Cl.
　　*G06T 7/70* (2017.01)
　　*G06T 7/50* (2017.01)
　　(Continued)

(52) U.S. Cl.
　　CPC .................. *G06T 7/70* (2017.01); *G06T 7/50* (2017.01); *G06T 7/60* (2013.01); *G06V 10/761* (2022.01);
　　(Continued)

(58) Field of Classification Search
　　CPC .... G06T 7/70; G06T 7/50; G06T 7/60; G06T 2207/10024; G06V 10/761; G06V 2201/07; G06V 20/52
　　See application file for complete search history.

(56) References Cited

U.S. PATENT DOCUMENTS

| | | | | |
|---|---|---|---|---|
| 10,679,428 | B1 * | 6/2020 | Chen | G06V 10/764 |
| 2021/0056365 | A1 * | 2/2021 | Sivan | G06V 20/58 |

(Continued)

FOREIGN PATENT DOCUMENTS

| | | | | |
|---|---|---|---|---|
| CA | 2989159 A1 * | 3/2018 | | A61B 34/20 |
| CN | 112784843 A * | 5/2021 | | G06K 9/342 |

OTHER PUBLICATIONS

Zhang, Ruohan, et al. "Agil: Learning attention from human for visuomotor tasks." Proceedings of the european conference on computer vision (eccv). 2018. (Year: 2018).*

(Continued)

*Primary Examiner* — Emily C Terrell
(74) *Attorney, Agent, or Firm* — FINNEGAN, HENDERSON, FARABOW, GARRETT & DUNNER, LLP

(57) ABSTRACT

The present disclosure provides system and method for object detection in a discontinuous space. The system receives at least one captured image from one or more computing devices associated with one or more users. The at least one captured image comprises one or more objects in the discontinuous space, and the one or more objects are associated with at least one attribute. The system computes a score corresponding to each of at least one attribute of the one or more objects. The system detects the one or more objects in the discontinuous space based on the computed score. Further, the system determines a similarity grade for the one or more detected objects, where the similarity grade corresponds to an accuracy of inference for the one or more detected objects. Finally, the system updates a database based on the accuracy of inference to facilitate object detection in the discontinuous space.

14 Claims, 8 Drawing Sheets

(51) Int. Cl.
_G06T 7/60_ (2017.01)
_G06V 10/74_ (2022.01)
(52) U.S. Cl.
CPC .............. _G06T 2207/10024_ (2013.01); _G06V 2201/07_ (2022.01)

(56) References Cited

U.S. PATENT DOCUMENTS

2021/0278908 A1* 9/2021 Gafni ................. G06V 10/7788
2023/0082097 A1* 3/2023 Choi ...................... G06V 20/56
382/156

OTHER PUBLICATIONS

Oudeyer, Pierre-Yves. "Computational theories of curiosity-driven learning." arXiv preprint arXiv:1802.10546 (2018). (Year: 2018).*

* cited by examiner

100

200

300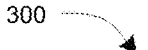

```
                    ┌─────────────────────────┐
                    │ SENSORY INPUT (VISUAL)  │
                    │          302            │
                    └─────────────────────────┘
                      │                     │
                      ▼                     ▼
          ┌──────────────────┐   ┌──────────────────────┐
          │   PREDICTION     │   │ DEEP-LEARNING MODELS │
          │     MODEL        │   │        308           │
          │      304         │   │                      │
          └──────────────────┘   └──────────────────────┘
                  │                        │
                  ▼                        ▼
       ┌──────────────────────┐  ┌──────────────────────┐
       │ PREDICTION (PHYSICAL │  │    GROUND TRUTH      │
       │    PROPERTIES)       │  │ (PHYSICAL PROPERTIES)│
       │        306           │  │        310           │
       └──────────────────────┘  └──────────────────────┘
                  │                        │
                  └───────────┬────────────┘
                              ▼
                  ┌──────────────────────┐
                  │     MEASURING        │
                  │   DISCONTINUITIES    │
                  │        312           │
                  └──────────────────────┘
                    │                 │
                    ▼                 ▼
       ┌──────────────────┐   ┌──────────────────────┐
       │    OBSERVED      │   │   NO DISCONTINUITY   │
       │  DISCONTINUITY   │   │         318          │
       │      314         │   │                      │
       └──────────────────┘   └──────────────────────┘
                  │                        │
                  ▼                        ▼
       ┌──────────────────┐   ┌──────────────────────┐
       │ CURIOSITY BLOCK  │   │   CONVERTING TO Z-   │
       │(RETURNS REASONING)│──▶│      NUMBER          │
       │      316         │   │   REPRESENTATION     │
       └──────────────────┘   │        320           │
                              └──────────────────────┘
                                         │
                                         ▼
                              ┌──────────────────────┐
                              │    ACCURACY OF       │
                              │     INFERENCE        │
                              │        322           │
                              └──────────────────────┘
                                         │
                                         ▼
                              ┌──────────────────────┐
                              │     DATABASE         │
                              │     UPDATION         │
                              │        324           │
                              └──────────────────────┘
```

FIG. 3

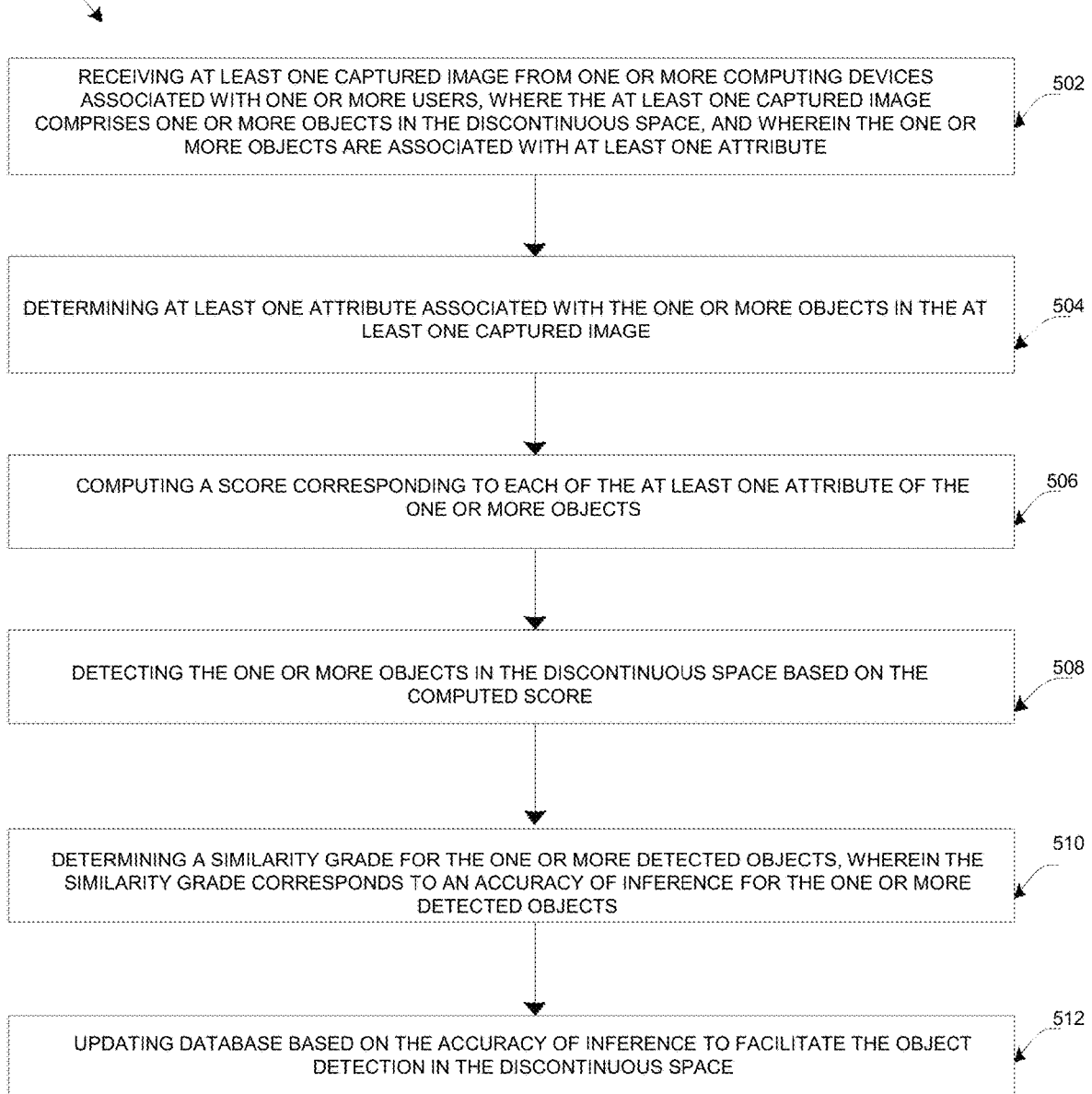

500

RECEIVING AT LEAST ONE CAPTURED IMAGE FROM ONE OR MORE COMPUTING DEVICES ASSOCIATED WITH ONE OR MORE USERS, WHERE THE AT LEAST ONE CAPTURED IMAGE COMPRISES ONE OR MORE OBJECTS IN THE DISCONTINUOUS SPACE, AND WHEREIN THE ONE OR MORE OBJECTS ARE ASSOCIATED WITH AT LEAST ONE ATTRIBUTE          502

DETERMINING AT LEAST ONE ATTRIBUTE ASSOCIATED WITH THE ONE OR MORE OBJECTS IN THE AT LEAST ONE CAPTURED IMAGE          504

COMPUTING A SCORE CORRESPONDING TO EACH OF THE AT LEAST ONE ATTRIBUTE OF THE ONE OR MORE OBJECTS          506

DETECTING THE ONE OR MORE OBJECTS IN THE DISCONTINUOUS SPACE BASED ON THE COMPUTED SCORE          508

DETERMINING A SIMILARITY GRADE FOR THE ONE OR MORE DETECTED OBJECTS, WHEREIN THE SIMILARITY GRADE CORRESPONDS TO AN ACCURACY OF INFERENCE FOR THE ONE OR MORE DETECTED OBJECTS          510

UPDATING DATABASE BASED ON THE ACCURACY OF INFERENCE TO FACILITATE THE OBJECT DETECTION IN THE DISCONTINUOUS SPACE          512

SYSTEM AND METHOD FOR OBJECT DETECTION IN DISCONTINUOUS SPACE

RESERVATION OF RIGHTS

A portion of the disclosure of this patent document contains material which is subject to intellectual property rights such as, but are not limited to, copyright, design, trademark, integrated circuit (IC) layout design, and/or trade dress protection, belonging to Jio Platforms Limited (JPL) or its affiliates (herein after referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

FIELD OF INVENTION

The embodiments of the present disclosure generally relate to handling data of non-linear, multi-variable complex systems. More particularly, the present disclosure relates to methods and systems for object detection in a discontinuous space.

BACKGROUND OF THE INVENTION

The following description of the related art is intended to provide background information pertaining to the field of disclosure. This section may include certain aspects of the art that may be related to various features of the present disclosure. However, it should be appreciated that this section be used only to enhance the understanding of the reader with respect to the present disclosure, and not as admissions of prior art.

Reinforcement learning (RL) is an area of machine learning that relates to a set of actions performed by intelligent agents in an environment in order to maximize the notion of cumulative reward. Reinforcement learning is one of three basic machine learning paradigms, alongside supervised learning and unsupervised learning. The way reinforcement learning works is broadly aligned with biological infants learning about the physical world. The intelligent agents perceive, act, and develop knowledge about the physical world, build concepts about it, and interlink the knowledge with the concepts to have a virtual simulation of the physical world. In general, infants learn a lot by observing actions, states, results, and then try to imitate similar actions. Such learning is termed as imitation learning.

Existing mechanisms disclose the use of neural networks (by the reinforcement learning agents) to determine an action to be performed in response to an observation/feedback. It should be understood that neural networks are machine learning models that employ one or more layers of non-linear units to predict an output for a received input. Each layer of the network generates an output from a received input in accordance with current values of a respective set of parameters.

However, the existing systems for generalized reinforcement learning involve few demonstrations, developing a knowledge base in an unsupervised fashion, taking inference for decisions, and updating the knowledge base when required. No contemporary system takes into consideration the ability that humans have, and to a certain extent, infants and animals have, to predict outcomes of physical interactions involving macroscopic objects and make an agent learn the intuitive physics associated with the object just by imitating a single or few demonstrations.

There is, therefore, a need in the art to provide a method and a system that can overcome the shortcomings of the existing prior arts.

OBJECTS OF THE PRESENT DISCLOSURE

Some of the objects of the present disclosure, which at least one embodiment herein satisfies are as listed herein below.

An object of the present disclosure is to provide a system and a method that facilitates object detection in a discontinuous space.

An object of the present disclosure is to provide a system and a method that facilitates learning about physical properties of an object intuitively with self-exploration.

An object of the present disclosure is to provide a system and a method that facilitates learning from new instances which is not limited to any type of data.

An object of the present disclosure is to provide a system and a method that facilitates requirement of very few demonstrations to enable an understanding of the object and its physical properties, i.e., learning intuitive physics.

An object of the present disclosure is to provide a system and a method that facilitates learning intuitive physics by interacting with everyday objects, i.e., learn the physics embedded in real-world dynamics, without particularly knowing the laws of physics.

An object of the present disclosure is to provide a system and a method that develops a way to generalize learnings by focusing on learning from learning (meta-learning), recalling concepts from the information in the knowledge base when required, and performing further experiments to fine-tune the actions.

An object of the present disclosure is to provide a system and a method that provides an estimate about an unknown object perceived along with its possible physical dynamics.

An object of the present disclosure is to provide a system and a method that performs deep learning and considers sub-parameters which can be further enhanced and improvised to other properties resulting in improved estimation of an object and its dynamics.

An object of the present disclosure is to provide a system and a method that utilizes a multi-sensory approach leading to enhance the capability and robustness of the method.

An object of the present disclosure is to provide a system and a method that provides training to machine learning-based computing devices to ensure adaptive sampling of highly complex data packets.

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure relates to a system for object detection in a discontinuous space. The system may include one or more processors coupled with a memory, where the memory stores instructions which when executed cause the one or more processors to receive at least one captured image from one or more computing devices associated with one or more users. The at least one captured image includes one or more objects in the discontinuous space. The one or more processors are configured to determine at least one attribute associated with the one or more objects in the at least one captured image, compute a score corresponding to each of the at least one attribute of the one or more objects, and detect the one or more objects in the discontinuous space based on the computed score. Further, the one or more processors are configured to determine a similarity grade for the one or more detected objects, where the similarity grade corresponds to an accuracy of inference for the one or more detected objects. Furthermore, the one or more processors are configured to update a database based on the accuracy of inference to facilitate the object detection in the discontinuous space.

In an embodiment, the score includes one or more Z-number representation. The one or more Z-number representation include a set of factors (X, A, B), where "X" represents the one or more objects, "A" represents a value associated with the at least one attribute for "X," and "B" represents a confidence value that "A" belongs to "X."

In an embodiment, the one or more processors are configured to detect the one or more objects by a comparison of the computed score with one or more previously stored scores in the database, where the comparison is based on one or more models, and where the one or more models include at least one of a visual attention model and a deep learning model.

In an embodiment, the visual attention model utilizes previously stored information in the database obtained from at least one of an imitation learning or a meta-data learning.

In an embodiment, the deep learning model utilizes ground truths obtained from at least one of a dataset label or a deep learning model prediction or a human intervention.

In an embodiment, the one or more Z-number representation includes: initially, "X"=0, and "A"=[$W_x$, $W_x^{avg}$, $P_1$, $P_2$, . . . , $P_N$], where "A" represents the value associated with the at least one attribute of the one or more objects, "$W_x$" represents weighted average matrix, "$W_x^{avg}$" represents average weight distribution, and "$P_1, P_2, \ldots, P_N$" represents physical attributes specific to a class of objects with similar representation.

In an embodiment, the one or more processors are configured to determine the accuracy of inference based on a comparison of the one or more detected objects to one or more previously stored objects in the database.

In an embodiment, the one or more objects include at least one of a cube, a cone, and a sphere. In an embodiment, the at least one attribute comprises at least one of a shape, a color, and a size of the one or more objects.

In an aspect, the present disclosure relates to a User Equipment (UE) for facilitating object detection in a discontinuous space. The UE includes one or more processors coupled with a memory, where the memory stores instructions which when executed cause the one or more processors to capture at least one image using an image capturing unit and transmit the at least one captured image to a system, where the at least one captured image includes one or more objects in the discontinuous space. The one or more objects are associated with at least one attribute. The one or more processors of the UE are configured to execute one or more instructions pertaining to actions corresponding to the one or more objects to facilitate the object detection in the discontinuous space.

In an aspect, the present disclosure relates to a method for object detection in a discontinuous space. The method includes receiving, by a processor, at least one captured image from one or more computing devices associated with one or more users. The at least one captured image includes one or more objects in the discontinuous space. The method includes determining, by the processor, at least one attribute associated with the one or more objects in the at least one captured image, computing, by the processor, a score corresponding to each of the at least one attribute of the one or more objects, and detecting, by the processor, the one or more objects in the discontinuous space based on the computed score. The method includes determining, by the processor, a similarity grade for the one or more detected objects, where the similarity grade corresponds to an accuracy of inference for the one or more detected objects. The method includes updating, by the processor, a database based on the accuracy of inference to facilitate the object detection in the discontinuous space.

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that invention of such drawings includes the disclosure of electrical components, electronic components or circuitry commonly used to implement such components.

FIG. 3 illustrates an exemplary flow diagram representation of a proposed mechanism, in accordance with an embodiment of the present disclosure.

FIG. 5 illustrates an exemplary flow diagram representation of a proposed method for object detection in a discontinuous space, in accordance with an embodiment of the present disclosure.

The foregoing shall be more apparent from the following more detailed description of the disclosure.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above.

Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

The present disclosure provides a robust and effective solution to implement a learning process motivated by a curiosity-based learning which encourages one or more devices such as, but not limited to, robotic devices to explore the environment instead of penalizing the robotic devices for a wrong decision and restricting the robotic devices from exploration. This incorporates learning from discontinuities in the real world that let the robotic devices reason the discontinuities and gain knowledge about the real world in an exploratory fashion.

The various embodiments throughout the disclosure will be explained in more detail with reference to FIGS. 1-7.

Figure 1:
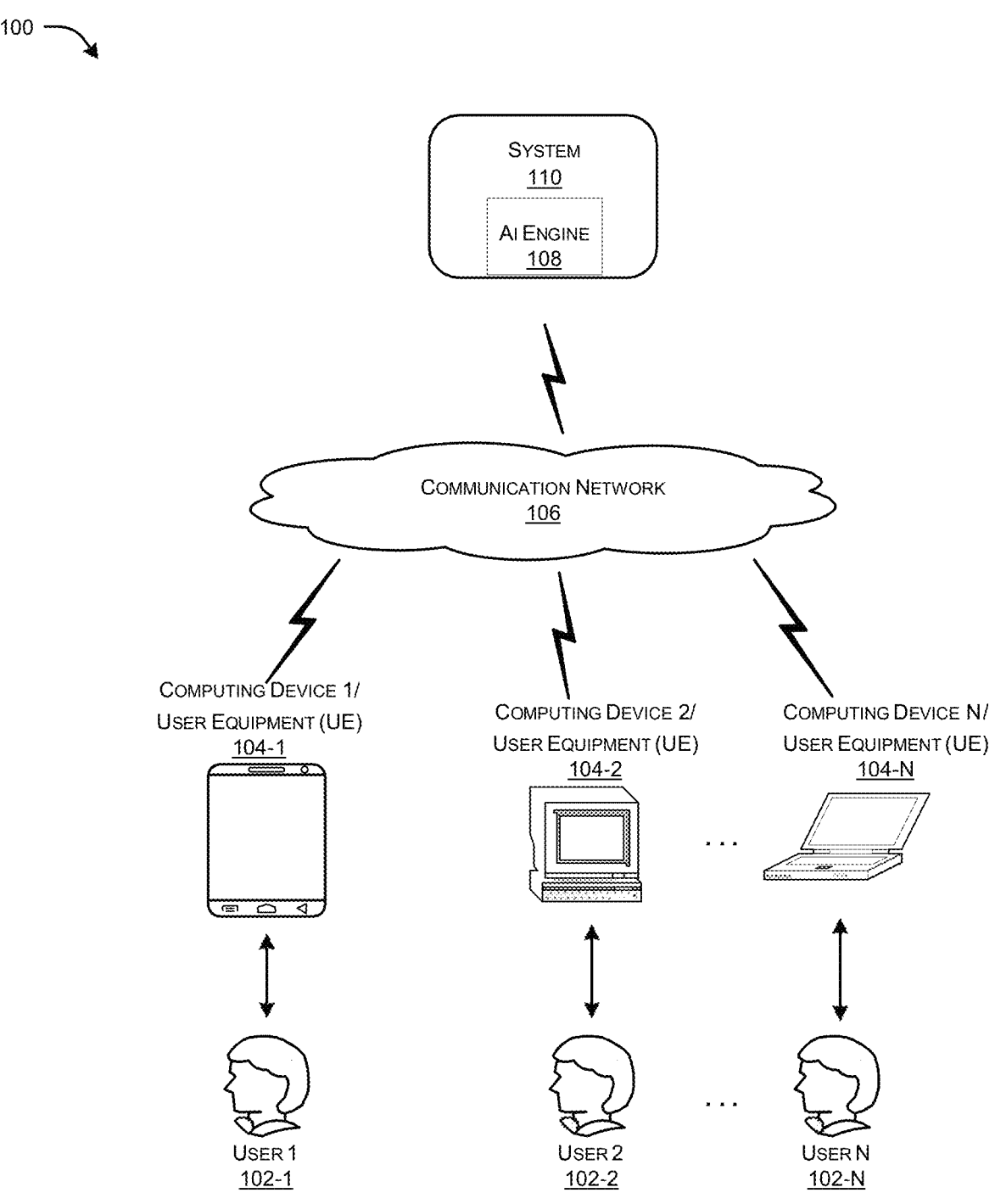
FIG. 1 illustrates exemplary network architecture in which or with which embodiments of the present disclosure may be implemented.

FIG. 1 illustrates an exemplary network architecture (100) in which or with which embodiments of the present disclosure may be implemented.

Referring to FIG. 1, the exemplary network architecture (100) is depicted in which or with which a system (110) for object objection in a discontinuous space may be implemented, in accordance with an embodiment of the present disclosure. As illustrated, the system (110) may be equipped with an artificial intelligence (AI) engine (108) for facilitating object detection in the discontinuous space.

In an embodiment, the system (110) may receive at least one captured image from one or more computing devices (104-1, 104-2 . . . 104-N) associated with one or more users (102-1, 102-2 . . . 102-N). In an embodiment, the system (110) may be communicatively coupled to the one or more computing devices (104-1, 104-2 . . . 104-N) through a communication network (106). A person of ordinary skill in the art will understand that one or more computing devices (104-1, 104-2 . . . 104-N) may be individually referred to as computing device (104) and collectively referred to as computing devices (104). Similarly, one or more users (102-1, 102-2 . . . 102-N) may be individually referred to as user (102) and collectively referred to as users (102). In an embodiment, the computing device (104) may also be referred to as User Equipment (UE). Accordingly, the terms "computing device" and "User Equipment" may be used interchangeably throughout the disclosure.

In an exemplary embodiment, the computing device (104) may include one or more processing units (not shown in FIG. 1) such as, but not limited to, a data transmitting unit, a data management unit, a mobility management unit, a display unit, and other units, wherein the other units may include, without limitation, a storage unit, a computing unit, and/or a signal generation unit.

In an embodiment, the computing device (104) may transmit the at least one captured image over a point-to-point or point-to-multipoint communication channel or network (106) to the system (110).

In an embodiment, the computing device (104) may involve collection, analysis, and sharing of data received from the system (110) via the communication network (106). In an embodiment, the computing device (104) may enable presentation of information to the one or more users (102).

In an embodiment, the first computing devices (104) may be coupled to at least one image capturing unit (not shown) to capture at least one image in the discontinuous space. In an embodiment, the at least one image may include one or more objects in the discontinuous space. In an embodiment, the at least one image capturing unit may reside within the computing device (104). Alternatively or additionally, the image capturing unit may be separate from the computing device (104), and be coupled to the computing device (104). In an exemplary embodiment, the at least one image capturing device may include, but not be limited to, a camera, a digital camera, a smartphone, and the like.

In an embodiment, the system (110) may execute one or more instructions, through the AI engine (108), on the at least one captured image including one or more objects in the discontinuous space. The system (110) may utilise the AI engine (108) to at least learn from the least one captured image.

In an embodiment, the AI engine (108) may involve deep reinforcement learning models that contribute towards a meta-learning approach such as learning from learning. In an embodiment, the AI engine (108) may be configured to learn from visual attention and deep learning models, and learn from imitation and by observation from discontinuities in the real world and facilitate database creation, updation, and inference, based on the at least one captured image.

In an embodiment, the at least one captured image may include one or more objects in the discontinuous space, and the one or more objects may be associated with at least one attribute. In an embodiment, the one or more objects may include, but not be limited to, a cube, a cone, a sphere, and the like. In an embodiment, the at least one attribute of the one or more objects may include, but not be limited to, a shape, a color, a size of the one or more objects, and the like.

Further, in an embodiment, the system (110) may be configured to determine at least one attribute associated with the one or more objects in the at least one captured image. The system (110) may be configured to compute a score corresponding to each of the at least one attribute of the one or more objects. In an embodiment, the system (110) may be configured to detect the one or more objects in the discontinuous space based on the computed score.

In an embodiment, the score comprises one or more Zadeh's (Z)-number representation. The one or more Z-number representation may include a set of factors (X, A, B). The factor "X" represents the one or more objects, the factor "A" represents a value associated with the at least one attribute for "X," and the factor "B" represents a confidence value indicating that "A" belongs to "X."

In an embodiment, the one or more Z-number representation initially comprise the following values: "X"=0, and "A"=[$W_x$, $W_x^{avg}$, $P_1$, $P_2$, . . . , $P_N$], where "$W_x$" represents weighted average matrix, "$W_x^{avg}$" represents average weight distribution, and "$P_1$, $P_2$, . . . , $P_N$" represent physical parameters specific to a class of the one or more objects with similar representation.

Figure 2:
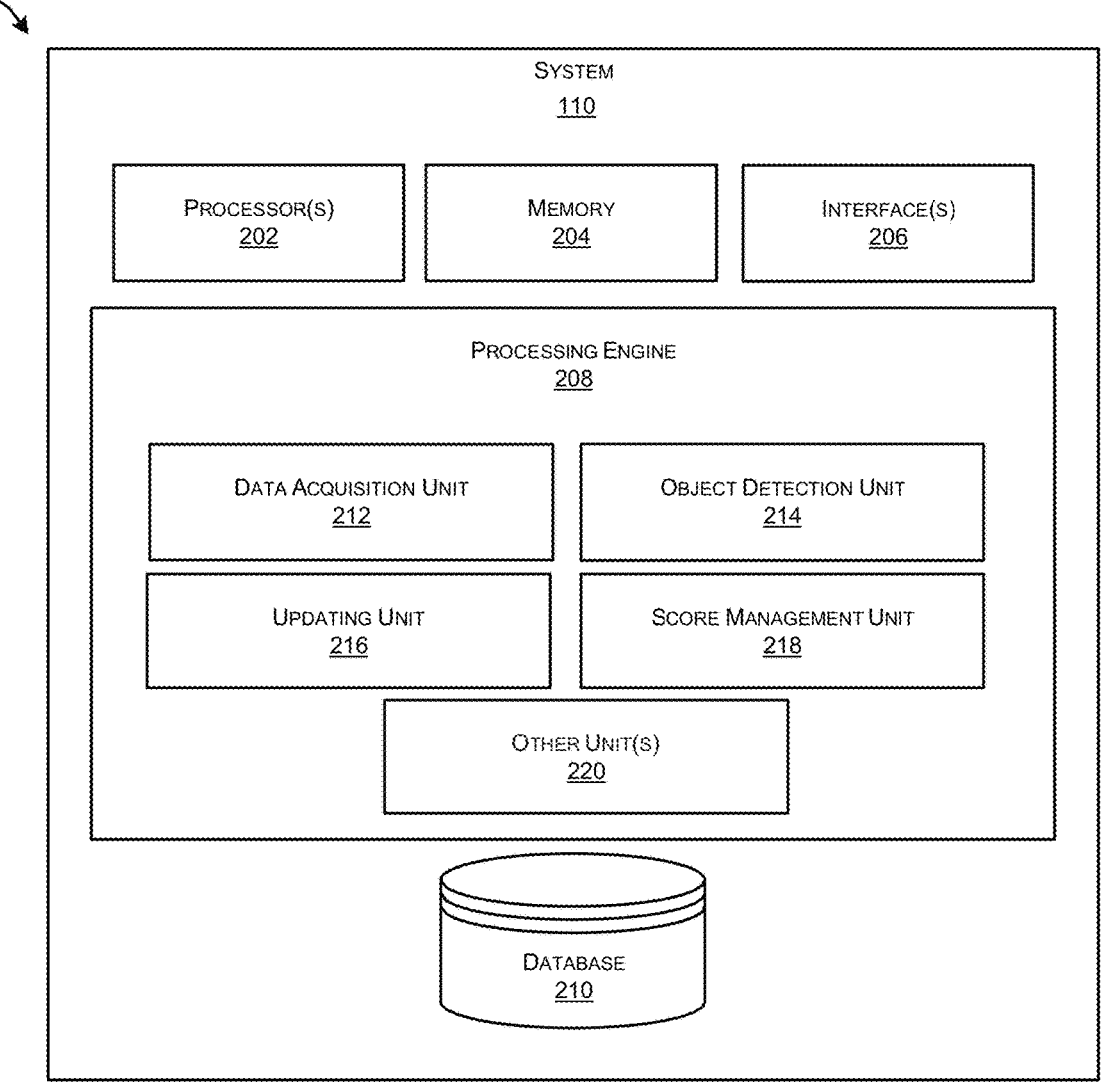
FIG. 2 illustrates an exemplary representation of a proposed system, in accordance with an embodiment of the present disclosure.

In an embodiment, the system (110) may be configured to detect the one or more objects based on a comparison of the one or more Z-number representation with one or more previously stored scores in a database (shown in FIG. 2 as 210). The comparison is based on one or more models including, but not limited to, a visual attention model and a deep learning model. In an embodiment, the AI engine (108) may utilize one of the models to compare the computed score with the one or more previously stored scores in the database. The visual attention model utilizes previously stored information in the database which is obtained from at least one of an imitation learning or a meta-data learning. The deep learning model utilizes ground truths obtained from at least one of a dataset label or a deep learning model prediction or a human intervention.

In an exemplary embodiment, the learning may be embedded in the form of a database which can be built and grown in an unsupervised fashion. The database may be created so that one or more objects in the discontinuous space have been captured, analysed, and stored in the database. The at least one attribute which is unique to the one or more objects may also be stored in the database. Any particular instance which is observed as new may contribute to an object's generalisability (i.e. updation process) and the characteristic attributes of the one or more objects further help the system to generalize the identified instance. The database generalisability is then used to infer pre-assumptions about the new instances it perceives and further adds to the knowledge base.

In an embodiment, the system (110) may further be configured to determine a similarity grade for the one or more detected objects. The similarity grade corresponds to an accuracy of inference for the one or more detected objects. Further, the accuracy of inference may be determined by comparing the one or more detected objects to one or more previous stored objects in the database. Finally, the system (110) may be configured to update the database based on the determined accuracy of inference to facilitate the object detection in the discontinuous space.

In an exemplary embodiment, the communication network (106) may include, but not be limited to, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. In an exemplary embodiment, the communication network (106) may include, but not be limited to, a wireless network, a wired network, an internet, an intranet, a public network, a private network, a packet-switched network, a circuit-switched network, an ad hoc network, an infrastructure network, a Public-Switched Telephone Network (PSTN), a cable network, a cellular network, a satellite network, a fiber optic network, or some combination thereof.

In an embodiment, the one or more computing devices (104) may communicate with the system (110) via a set of executable instructions residing on any operating system. In an embodiment, the one or more computing devices (104) may include, but not be limited to, any electrical, electronic, electro-mechanical, or an equipment, or a combination of one or more of the above devices such as mobile phone, smartphone, Virtual Reality (VR) devices, Augmented Reality (AR) devices, laptop, a general-purpose computer, desktop, personal digital assistant, tablet computer, mainframe computer, or any other computing device, wherein the one or more computing devices (104) may include one or more in-built or externally coupled accessories including, but not limited to, a visual aid device such as camera, audio aid, a microphone, a keyboard, input devices for receiving input from the user (102) such as touch pad, touch enabled screen, electronic pen, receiving devices for receiving any audio or visual signal in any range of frequencies, and transmitting devices that can transmit any audio or visual signal in any range of frequencies. It may be appreciated that the one or more computing devices (104) may not be restricted to the mentioned devices and various other devices may be used.

Although FIG. 1 shows exemplary components of the network architecture (100), in other embodiments, the network architecture (100) may include fewer components, different components, differently arranged components, or additional functional components than depicted in FIG. 1. Additionally, or alternatively, one or more components of the network architecture (100) may perform functions described as being performed by one or more other components of the network architecture (100).

FIG. 2 illustrates an exemplary representation of the proposed system, for example, the system (110) of FIG. 1, in accordance with an embodiment of the present disclosure.

FIG. 2 with reference to FIG. 1, illustrates an exemplary representation of the system (110) for facilitating training of a neural network, in accordance with an embodiment of the present disclosure. In an aspect, the system (110) may comprise one or more processor(s) (202). The one or more processor(s) (202) may be implemented as one or more microprocessors, microcomputers, microcontrollers, edge or fog microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the system (110). The memory (204) may be configured to store one or more computer-readable instructions or routines in a non-transitory computer readable storage medium, which may be fetched and executed to create or share data packets over a network service. The memory (204) may comprise any non-transitory storage device including, for example, volatile memory such as Random Access Memory (RAM), or non-volatile memory such as Erasable Programmable Read-Only Memory (EPROM), flash memory, and the like.

Referring to FIG. 2, the system (110) may include an interface(s) 206. The interface(s) (206) may comprise a variety of interfaces, for example, interfaces for data input and output devices, referred to as I/O devices, storage devices, and the like. The interface(s) (206) may facilitate communication to/from the system (110). The interface(s) (206) may also provide a communication pathway for one or more components of the system (110). Examples of such components include, but are not limited to, processing unit/engine(s) (208) and a database (210).

In an embodiment, the processing unit/engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor-executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the system (110) may comprise the machine-readable storage medium storing the instructions and the processing resource to execute the instructions, or the machine-readable storage medium may be separate but accessible to the system (110) and the processing resource. In other examples, the processing engine(s) (208) may be implemented by electronic circuitry.

In an embodiment, the database (210) may comprise data that may be either stored or generated as a result of functionalities implemented by any of the components of the processor (202) or the processing engines (208). In an embodiment, the database (210) may be separate from the system (110).

In an exemplary embodiment, the processing engine (208) may include one or more engines selected from any of a data acquisition unit (212), an object detection unit (214), an updating unit (216), a score management unit (218), and other units (220) such as, but not limited to, the AI engine (108) of FIG. 1. The processing engine (208) may further be dedicated for executing complex schematic processing but not limited to the like.

In an embodiment, the data acquisition unit (212) may receive at least one captured image from one or more computing devices such as, the one or more computing devices (104) of FIG. 1, pertaining to one or more objects in the discontinuous space.

In an embodiment, the object detection unit (214) may enable detection of the one or more objects in the at least one captured image.

In an embodiment, the updating unit (216) may update the database (210) with information related to the one or more objects once the one or more objects have been detected in the discontinuous space.

In an embodiment, the score management unit (218) may enable management of computed scores such as, one or more Z-number representation, or the like, which facilitate the object detection.

FIG. 3 illustrates an exemplary flow diagram representation of a proposed mechanism (300), in accordance with an embodiment of the present disclosure.

At step 302, at least one captured image may be provided as a sensory input to the proposed system such as, the system (110) of FIGS. 1-2. At step 304, a prediction model is utilized by the system (110) to compare the at least one captured image with previous stored information in a database such as, the database (210) of FIG. 2. At step 306, the prediction model predicts one or more physical properties such as attributes of one or more objects in the at least one captured image. In an embodiment, the prediction model may utilize previously stored information in the database which may be obtained from at least one of a visual attention, an imitation learning, or a meta-data learning. Simultaneously, at step 308, a deep learning model is utilized by the system (110) to comparing the at least one captured image with ground truth. At step 310, the deep learning model determines one or more physical properties/ attributes of the one or more objects based on the ground truth, i.e., representation of the properties of the one or more objects in real-world dynamics. In an embodiment, the deep learning model may include at least one of a dataset label or a deep learning model prediction or a human intervention.

Further, at step 312, discontinuities are measured by the system (110) by comparing the predicted attributes of the one or more objects and the determined attributes based on ground truth. If there are discontinuities, then, at step 314, the system (110) observes discontinuities in the predicted and determined attributes of the one or more objects. As a result, at step 316, a curiosity based mechanism is applied to detect the one or more objects, where the curiosity based mechanism deals with reasoning ability, and returns a reasoning for the measured discontinuities.

Further, at step 318, in case the system (110) determines that there is no discontinuity at step 312, then the system (110) computes a score for each of the predicted/determined attributes of the one or more objects in the at least one captured image at step 320. In an embodiment, the score may be in the form of a Z-number based representation. At step 322, an accuracy of inference is determined based on the computed score of the attribute(s). In an embodiment, the system (110) determines a similarity grade based on the computed score. In an embodiment, the similarity grade corresponds to the accuracy of inference obtained by comparing the one or more detected objects to one or more previous objects information stored in the database. It may be appreciated that it is not always necessary that the prediction of the one or more objects is correct. Further, even if the prediction of the one or more objects is incorrect, the system (110) will continue to explore and identify the one or more objects and the accuracy of inference is verified based on the correctness of the detected one or more objects. At step 324, once the inference is drawn, the database (210) is updated with the information pertaining to the one or more detected objects.

Figure 4:
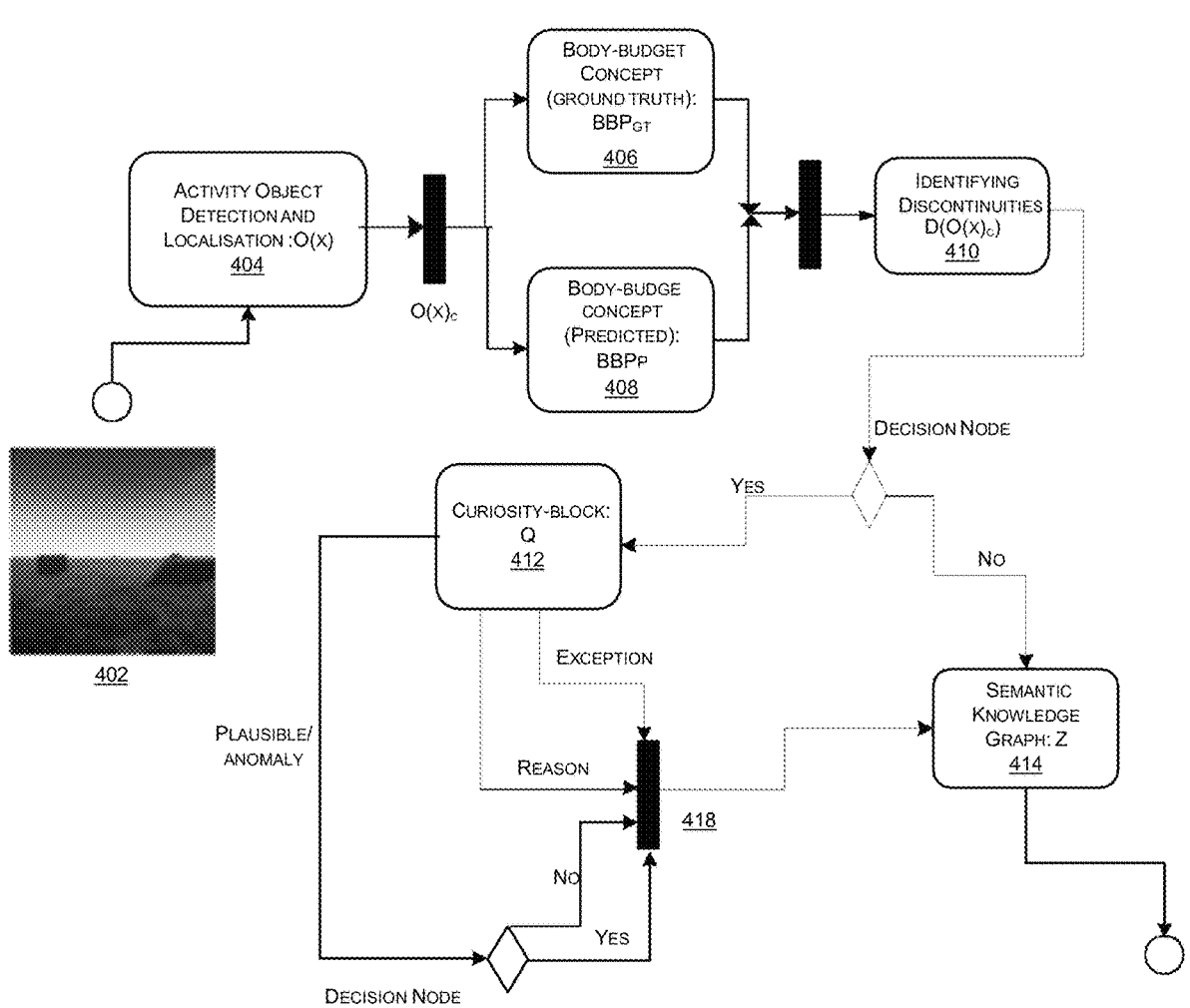
FIG. 4 illustrates an exemplary block representation of the system architecture, in accordance with an embodiment of the present disclosure.

FIG. 4 illustrates an exemplary flow chart (400) of a system architecture, for example, the system (110) of FIGS. 1-2, in accordance with an embodiment of the present disclosure.

In an embodiment, the system (110) may receive at least one image (402) captured from one or more computing devices such as, the computing devices (104) of FIG. 1. As can be seen, the at least one captured image (402) may include one or more objects associated with at least one attribute in a discontinuous space. The implementation of the proposed system (110) may include, but not be limited to, intuitive physics learning. The at least one captured image (402) may be processed to detect activity object detection and localization (404). In an embodiment, the at least one captured image may be analysed to determine the one or more objects at 404. Further, by using a body-budget concept of ground truth (BBP$_{GT}$) (406), the system (110) may determine one or more attributes based on ground truth. Furthermore, by using a body-budget concept of prediction (BBP$_P$) (408), the system (110) may predict one or more attributes associated with the one or more objects. Based on the predicted attributes and the determined attributes (ground truth), the system (110) may identify discontinuities (410).

In an embodiment, the system determines at a decision node if there are discontinuities in the predicted and the determined attributes. If there are discontinuities, then the system (110) may invoke a curiosity mechanism (412). In an embodiment, the system (110) executes the curiosity mechanism (412), based on existence of the one or more objects in the discontinuity space. In an embodiment, the curiosity mechanism (412) includes dataset which constitutes a set of possible and impossible events presented through animations/images (402). Every event in the dataset includes one or more objects, which can be any or all of a cube, cone, and a sphere. These events can be further classified as static or dynamic based on the movement of the one or more objects in the event. Further, the curiosity mechanism (412) arrives at an outcome (418) which possibly includes instincts such as exception, reason, plausible/anomaly in the detected discontinuities in the attributes of the one or more objects. Finally, the system (110) builds a schematic knowledge graph (414) for the one or more objects based on detected outcome of the discontinuity.

If there are no discontinuities, the system (110) may proceed with computing scores (414) in the form of Z-numbers for the determined attributes of the one or more detected objects. In an embodiment, the system (110) may build a schematic knowledge graph based on non-existence of the one or more objects in the discontinuity space.

In an embodiment, the score generated by the system (110) at 414 is a function of parameters of body budget of the one or more objects multiplied with constants ($\alpha$, $\beta$, $\gamma$) with values ranging from 0 to 1, which determines the priority of a particular concept.

In an embodiment, based on the generated score, a database is updated. It will be appreciated that the steps shown in FIG. 4 are merely illustrative. Other suitable steps may be used, if desired. Moreover, the steps of the flow chart 400 may be performed in any order and may include additional steps.

FIG. 5 illustrates an exemplary flow diagram of a method (500) for object detection in a discontinuous space, in accordance with an embodiment of the present disclosure.

At step 502, the method (500) includes receiving, by a processor (202) of FIG. 2, at least one captured image from one or more computing devices associated with one or more users. In an embodiment, the at least one captured image includes one or more objects in a discontinuous space. In an embodiment, the one or more objects are associated with at least one attribute. In an embodiment, the one or more objects may include, but not be limited to, a cube, a cone, a sphere, and the like. In an embodiment, the attribute(s) of the one or more objects may include, but not be limited to, a shape, a color, a size of the one or more objects, and the like.

At step 504, the method (500) includes determining, by the processor (202), at least one attribute associated with the one or more objects in the at least one captured image.

At step 506, the method (500) includes computing, by the processor (202), a score corresponding to each of the at least one attribute of the one or more objects. The system (110) may be configured to detect the one or more objects based on a comparison of the one or more Z-number representation with one or more previously stored scores in a database The one or more Z-number representation may include a set of factors (X, A, B). The factor "X" represents the one or more objects, the factor "A" represents a value associated with the at least one attribute for "X," and the factor "B" represents a confidence value indicating that "A" belongs to "X."

At step 508, the method (500) includes detecting, by the processor (202), the one or more objects in the discontinuous space based on the computed score. The system (110) may be configured to detect the one or more objects by a comparison of the computed score with one or more previously stored scores in the database (210). The comparison is based on one or more models, which comprise at least one of the visual attention model and the deep learning model.

In an embodiment, the visual attention model utilizes previously stored information in the database which is obtained from at least one of an imitation learning or a meta-data learning. In an embodiment, the deep learning model utilizes ground truth which are obtained from at least one of a dataset label or a deep learning model prediction or a human intervention.

At step 510, the method (500) includes determining, by the processor (202), a similarity grade for the one or more detected objects, wherein the similarity grade corresponds to an accuracy of inference for the one or more detected objects. Further, the accuracy of inference may be determined by comparing the one or more detected objects to one or more previous stored objects in the database.

At step 512, the method (500) includes updating, by the processor (202), a database such as the database (210) of FIG. 2, based on the accuracy of inference to facilitate the object detection in the discontinuous space.

In an embodiment, the system (110) may be configured to create and update database (210) so that one or more objects in the discontinuous space have been captured, analysed, and stored in the database (210). Any particular instance which is observed as new may contribute to an updation process pertaining to the one or more objects and the attributes of the one or more objects further help the system (110) to generalize the identified instances.

Figure 6A:
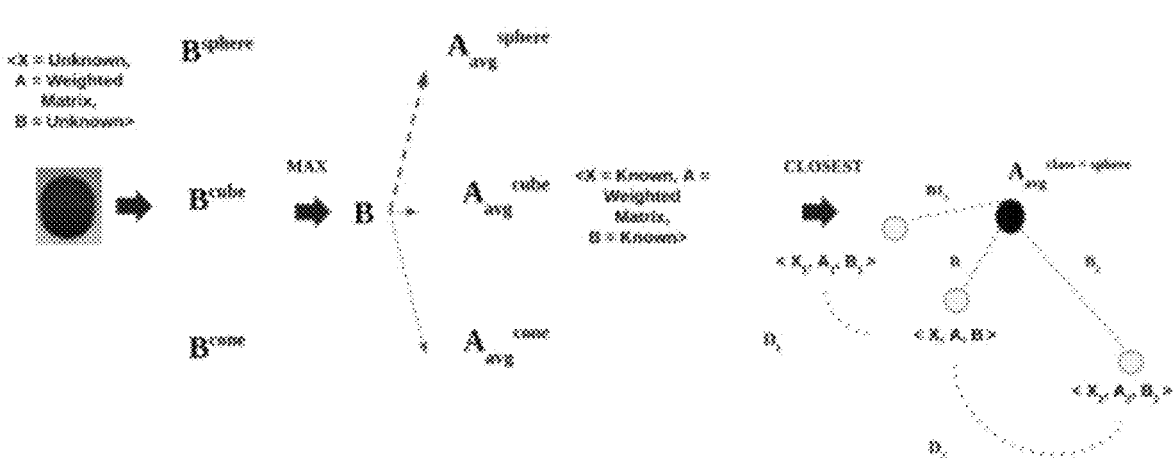
FIGS. 6A-6C illustrate exemplary representations of implementation analysis, in accordance with an embodiment of the present disclosure.
Figure 6B:
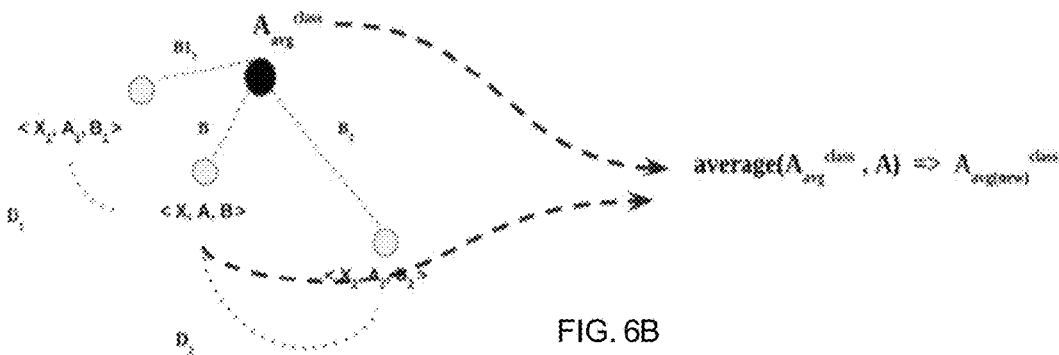
Figure 6C:
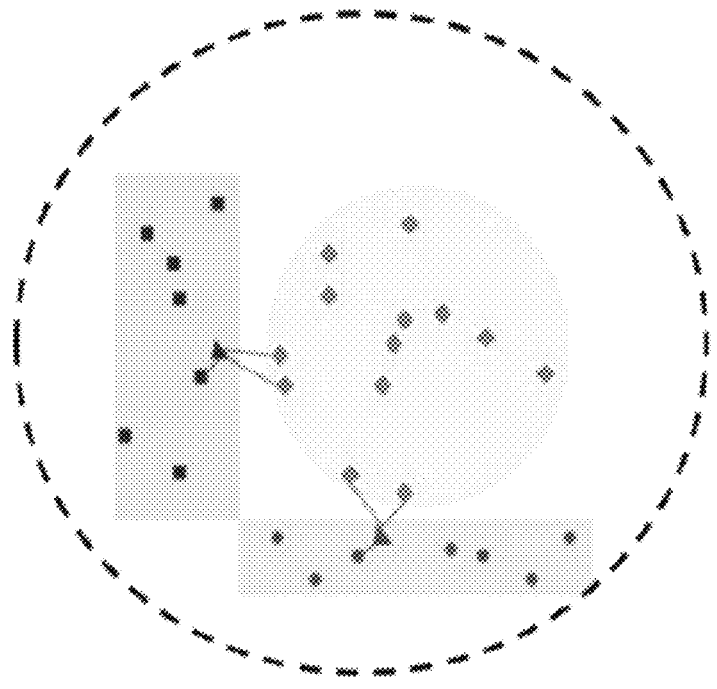

FIGS. 6A-6C illustrate exemplary representations of implementation analysis, in accordance with embodiments of the present disclosure.

As illustrated, the proposed system may be configured to create and/or update a database by using Z-number representation. As discussed above, the Z-number representation may include the set of factors which are <X, A, B>. In an embodiment, the Z-number representation initially comprise the following value for one or more objects, "X" will be null, and "A" is the score representing physical attributes/properties of one or more objects. The basic equation is mentioned below.

$$A = [W_x, W_x^{avg}, P_1, P_2 \ldots P_N]$$

where $P_1$, $P_2$, . . . ,$P_N$ are physical attributes/parameters specific to a class of the one or more objects with similar representation.

In an embodiment, the factor "A" of the Z-number representation is a list of parameters that are dynamic in nature. "A" is the instantiation of "X" at the given point, where "A" belongs to the universe of discourse. The evaluation of the computed score for each physical parameter may include, but not be limited to, object permanence, spatial-temporal continuity, shape constancy, and the like. The list of parameters represents unique attributes/characteristics of the one or more objects in the discontinuous space.

In an embodiment, a hypothetical space (also referred as latent space herein) is considered in FIG. 6A. The latent space is similar to plotting data points in a 2-dimensional (2D) plane and classifying the plotted data points using clustering mechanism. The scores obtained for the one or more objects are plotted in the latent space. The one or more objects may include, but not be limited to, at least one of a cube, a cone, and a sphere, wherein the attributes may include, but not be limited to, at least one of a shape, a color, and a size of the one or more objects.

In an embodiment, the proposed system may be configured to detect the one or more objects by comparison of the computed scores with one or more previously stored scores in a database. The comparison may be based on one or more models, and where the one or more models comprise at least one of the visual attention model and the deep learning model. The closer the value of the computed score to an average weighted e, the more confident or as such, the more will be the accuracy of inference of the system to classify the one or more objects in a specific class of objects having similar representation. The score generated is a function of parameters of body budget multiplied with constants ($\alpha$, $\beta$, $\gamma$) with values ranging from 0 to 1, determining the priority of a particular concept. A priority is decided on the basis of the presence of the occluder. Theoretical representation of the factors in the database, for example, <X1, A1, B1> is a representation for one object (also referred as event). The scores for A1 continues averaging to update $A_{avg}$ for a particular class (similar to the k-means clustering), where the same class data lies together and has adequate distance from other classes of the objects with similar representation.

In an embodiment, FIGS. 6A-6C represent database visualization of different classes and data points. For instance, when a new object is observed, accuracy of inference is detected as follows: lesser the value of "B," closer the object lies to "$A_{avg}$" resulting in the new object lying in the closest range of the given class of objects.

In an embodiment, the factor "A" includes the composition of "$W_x$" represented as weighted average matrix and "$W_x^{avg}$" represented as average weight distribution. Further, equations (1) and (2) depict $\mu_x$ and $\mu_y$ which are mean value of the at least one captured image of the one or more objects, x(detected) and y(averaged), c1 and c2 are constants, $\sigma_x^2$ and $\sigma_y^2$ is the variance for at least one captured image of the one or more objects x(detected) and y(averaged).

$$\mu_x = \frac{\sum_{i=1}^{n} xi}{n} \tag{1}$$

$$\sigma_x^2 = \frac{\sum (xi - \mu x)2}{n} \tag{2}$$

In an embodiment, the value of factor "A" belongs to dynamic list and comprises multiple parameters associated with a particular class. For instance, the parameters may include, but not be limited to, color, shape, size, and the like. The value of "A" may lead to a graph-like representation which will lie in independent latent space of the class, and the closeness would be dependent on the confidence and other parameters such as color parameters as mentioned above. For example, the object class sphere with different colors lie apart from each other as compared to the one with similar color parameter. The confidence value "B" is calculated based on structural similarity between the object's (x and y) images.

In an embodiment, the value of "A" includes physical characteristics/parameters/attributes which are used to measure the closeness of the one or more objects, when compared with the available classes of the representations. The value of "B" may be calculated which results in the similarity score representing confidence of the one or more objects when compared to the previously stored information in a database. Higher the calculated value of the one or more objects, closer is the representation, and more are the chances that the one or more objects belong to that particular representation class of the one or more objects with similar representation.

FIG. 6B depicts the database updation process. Once the one or more objects are identified with the class of the one or more objects with similar representation, the weighted average matrix contributes to weighted average distribution (an averaging process whose impact is dependent on the confidence). Higher the value of "B," more is the impact of the weighted average matrix to form new weighted average distribution.

As illustrated in FIG. 6C, a representation of at least three different classes are shown. Each data point here represents a Z-number representation particular to an instance which means the values for X, A, and B. For example, for an object image of sphere, value "X" will contain an identity I1 representing sphere class. A value will contain the matrix of its feature presentation (eigen vector matrix), the average eigen vector matrix unique for the representation I1, parameter scores $P_1$, $P_2$, . . . ,$P_N$, such as color, size, friction value, and the like. Thus, the database is formed or updated.

Figure 7:
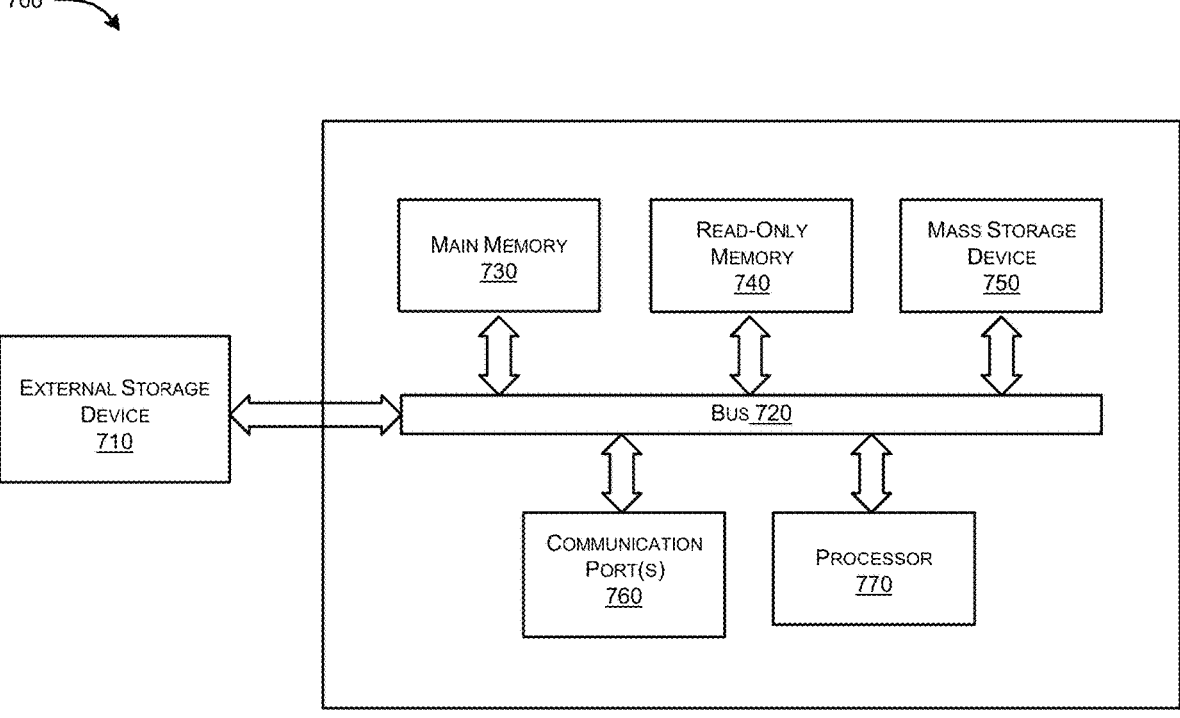
FIG. 7 illustrates an exemplary computer system in which or with which embodiments of the present disclosure may be implemented.

FIG. 7 illustrates an exemplary computer system (700) in which or with which embodiments of the present disclosure may be implemented. In an embodiment, a UE such as, the UE (104) of FIG. 1 and/or the proposed system (110) of FIGS. 1-2 may be implemented as the computer system (700).

As shown in FIG. 7, the computer system (700) may include an external storage device (710), a bus (720), a main memory (730), a read-only memory (740), a mass storage device (750), communication port(s) (760), and a processor (770). A person skilled in the art will appreciate that the computer system (700) may include more than one processor and communication ports. The processor (770) may include various modules associated with embodiments of the present disclosure. The communication port(s) (760) may be any one of an RS-232 port for use with a modem based dialup connection, a 10/100 Ethernet port, a Gigabit or 10 Gigabit port using copper or fibre, a serial port, a parallel port, or other existing or future ports. The communication port(s) (760) may be chosen depending on a network, or any network to which the computer system (700) connects. The main memory (730) may be Random Access Memory (RAM), or any other dynamic storage device commonly known in the art. The read-only memory (740) may be any static storage device(s). The mass storage device (750) may be any current or future mass storage solution, which can be used to store information and/or instructions.

The bus (720) communicatively couples the processor(s) (770 with the other memory, storage, and communication blocks. Optionally, operator and administrative interfaces, e.g. a display, keyboard, and a cursor control device, may also be coupled to the bus (720) to support direct operator interaction with the computer system (700). Other operator and administrative interfaces can be provided through network connections connected through the communication port(s) (760). Components described above are meant only to exemplify various possibilities. In no way should the aforementioned exemplary computer system (700) limit the scope of the present disclosure.

While considerable emphasis has been placed herein on the preferred embodiments, it will be appreciated that many embodiments can be made and that many changes can be made in the preferred embodiments without departing from the principles of the disclosure. These and other changes in the preferred embodiments of the disclosure will be apparent to those skilled in the art from the disclosure herein, whereby it is to be distinctly understood that the foregoing descriptive matter to be implemented merely as illustrative of the disclosure and not as limitation.

Advantages of the Present Disclosure

The present disclosure provides a system and a method that facilitates object detection in a discontinuous space.

The present disclosure facilitates learning about physical properties of an object intuitively with self-exploration.

The present disclosure facilitates learning from new instances which is not limited to any type of data.

The present disclosure facilitates requirement of very few demonstrations to enable an understanding of the object and its physical properties i.e. learning intuitive physics.

The present disclosure facilitates learning intuitive physics by interacting with everyday objects, i.e., learn the physics embedded in real-world dynamics, without particularly knowing the laws of physics.

The present disclosure develops a way to generalize learnings by focusing on learning from learning (meta-learning), recalling concepts from the information in the knowledge base when required, and performing further experiments to fine-tune the actions.

The present disclosure provides an estimate about an unknown object perceived along with its possible physical dynamics.

The present disclosure performs deep learning and considers sub-parameters which can be further enhanced and improvised to other properties resulting in improved estimation of an object and its dynamics.

The present disclosure utilizes a visual sensory approach leading to enhance the capability and robustness of the method.

We claim:

1. A system for object detection in a discontinuous space, the system comprising:

one or more processors coupled with a memory, wherein said memory stores instructions which when executed cause the one or more processors to:

receive at least one captured image from one or more computing devices associated with one or more users, wherein the at least one captured image comprises one or more objects in the discontinuous space;

determine at least one attribute associated with the one or more objects in the at least one captured image;

compute a score corresponding to each of the at least one attribute of the one or more objects, wherein the score comprises one or more Z-number representations, wherein the one or more Z-number representations comprise: initially, "X"=0, and "A"=[Wx, Wxavg, P1, P2, . . . ,PN], wherein "A" represents the value associated with the at least one attribute of the one or more objects, "Wx" represents a weighted average matrix, "Wxavg" represents an average weight distribution, and "P1, P2, . . . ,PN" represent physical attributes specific to a class of objects with similar representations;

detect the one or more objects in the discontinuous space based on the computed score;

determine a similarity grade for the one or more detected objects, wherein the similarity grade corresponds to an accuracy of inference for the one or more detected objects; and update a database based on the accuracy of inference to facilitate the object detection in the discontinuous space.

2. The system as claimed in claim 1, wherein the one or more Z-number representation comprise a set of factors (X, A, B), and wherein "X" represents the one or more objects, "A" represents a value associated with the at least one attribute for "X," and "B" represents a confidence value that "A" belongs to "X".

3. The system as claimed in claim 1, wherein the one or more processors are configured to detect the one or more objects by a comparison of the computed score with one or more previously stored scores in the database, wherein the comparison is based on one or more models, and wherein the one or more models comprise at least one of: a visual attention model and a deep learning model.

4. The system as claimed in claim 3, wherein the visual attention model utilizes previously stored information in the database obtained from at least one of an imitation learning or a meta-data learning.

5. The system as claimed in claim 3, wherein the deep learning model utilizes ground truths obtained from at least one of a dataset label or a deep learning model prediction or a human intervention.

6. The system as claimed in claim 1, wherein the one or more processors are configured to determine the accuracy of inference based on a comparison of the one or more detected objects to one or more previously stored objects in the database.

7. The system as claimed in claim 1, wherein the one or more objects comprise at least one of: a cube, a cone, and a sphere, and wherein the at least one attribute comprises at least one of: a shape, a color, and a size of the one or more objects.

8. A method for object detection in a discontinuous space, the method comprising:

receiving, by a processor, at least one captured image from one or more computing devices associated with one or more users, wherein the at least one captured image comprises one or more objects in the discontinuous space;

determining, by the processor, at least one attribute associated with the one or more objects in the at least one captured image;

computing, by the processor, a score corresponding to each of the at least one attribute of the one or more objects, wherein the score comprises one or more Z-number representations, wherein the one or more Z-number representations comprise: initially, "X"=0, and "A"=[Wx, Wxavg, P1, P2, . . . ,PN], wherein "A" represents the value associated with the at least one attribute of the one or more objects, "Wx" represents a weighted average matrix, "Wxavg" represents an average weight distribution, and "P1, P2, . . . ,PN" represent physical attributes specific to a class of objects with similar representations;

detecting, by the processor, the one or more objects in the discontinuous space based on the computed score;

determining, by the processor, a similarity grade for the one or more detected objects, wherein the similarity grade corresponds to an accuracy of inference for the one or more detected objects; and updating, by the processor, a database based on the accuracy of inference to facilitate the object detection in the discontinuous space.

9. The method as claimed in claim 8, wherein the one or more Z-number representation comprise a set of factors (X, A, B), and wherein "X" represents the one or more objects, "A" represents a value associated with the at least one attribute for "X," and "B" represents a confidence value that "A" belongs to "X".

10. The method as claimed in claim 8, wherein detecting, by the one or more processors, the one or more objects comprises comparing, by the processor, the computed score with one or more previously stored scores in the database, wherein the comparison is based on one or more models, and wherein the one or more models comprise at least one of: a visual attention model and a deep learning model.

11. The method as claimed in claim 10, wherein the visual attention model utilizes previously stored information in the database obtained from at least one of an imitation learning or a meta-data learning.

12. The method as claimed in claim 10, wherein the deep learning model utilizes ground truths obtained from at least one of a dataset label or a deep learning model prediction or a human intervention.

13. The method as claimed in claim 9, wherein the one or more objects in the discontinuous space are observed to compute the one or more Z-number representation to invoke a curiosity-based learning model.

14. The method as claimed in claim 8, wherein the one or more objects comprises at least one of: a cube, a cone, and a sphere, and wherein the at least one attribute comprises at least one of: a shape, a color, and a size of the one or more objects.

* * * * *